L. FRANK.
DIRECTION INDICATOR.
APPLICATION FILED APR. 7, 1921.
1,384,248.
Patented July 12, 1921.
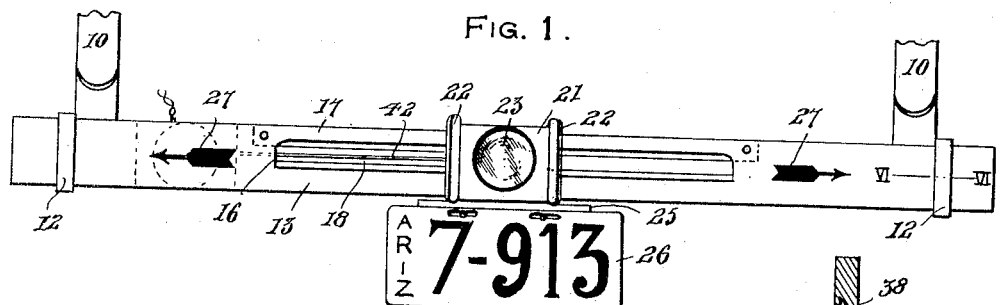
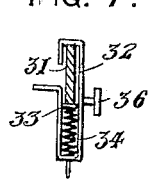
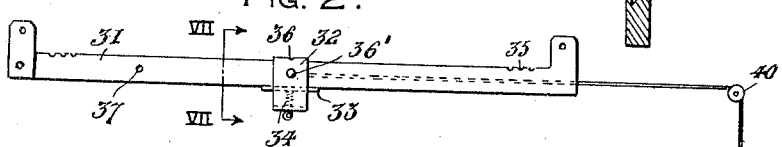
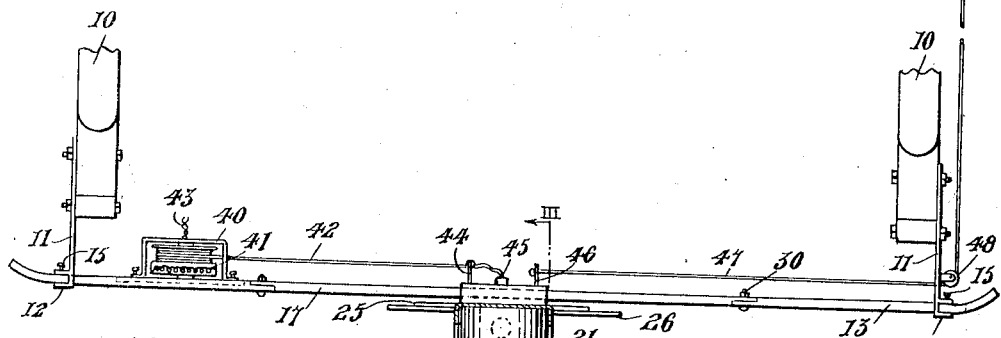
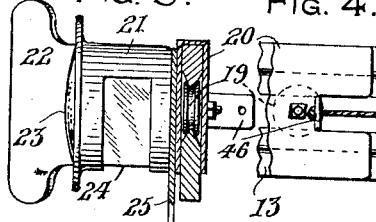
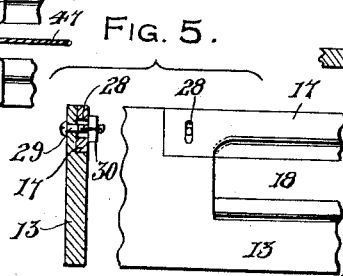
Inventor
Louis Frank

UNITED STATES PATENT OFFICE.

LOUIS FRANK, OF MIAMI, ARIZONA.

DIRECTION-INDICATOR.

1,384,248. Specification of Letters Patent. Patented July 12, 1921.

Application filed April 7, 1921. Serial No. 459,313.

*To all whom it may concern:*

Be it known that I, LOUIS FRANK, a citizen of the United States of America, residing at Miami, in the county of Gila and State of Arizona, have invented certain new and useful Improvements in Direction-Indicators, of which the following is a specification.

This invention relates to signals and has special reference to an automobile signal and direction indicator.

One object of the invention is to improve the general construction of devices of this character.

A second important object of the invention is to provide a tail light which may be slid from side to side of the machine, the light carrying with it the automobile numbering plate so that the latter is at all times properly illuminated.

A third object of the invention is to provide an improved arrangement of signal combining the signal supported with the rear spring bumper of the machine.

A fourth important object is to provide an improved form of signal wherein the conductor cord serves the double function of carrying current to the signal and acting as a cable to draw the signal in one direction.

A further important object of the invention is to provide an improved form of signal lamp for use on the rear spring bumper of an automobile and wherein contact by another car with the lamp will not injure the latter under ordinary circumstances.

With the above another object in view as will hereinafter be apparent, the invention consists in general of certain novel details of construction and combinations of parts hereinafter fully described, allowed in the accompanying drawings, and specifically claimed.

In the accompanying drawings, like characters of reference indicate like parts in the several views, and:—

Figure 1 is a rear elevation of the improved device and the bumper supporting the same.

Fig. 2 is a plan view partly in section showing the entire device assembled.

Fig. 3 is a section on the line III—III of Fig. 2.

Fig. 4 is an enlarged detail view showing the method of attaching the drawing cord or cable to the lamp.

Fig. 5 shows in section and elevation the method of adjustably connecting the top and bottom members of the bumper whereby to compensate to wear.

Fig. 6 is a section on the line VI—VI of Fig. 1.

Fig. 7 is a section on the line VII—VII of Fig. 2.

Fig. 8 is a detail section showing the means whereby the winding drum can be adjusted longitudinally of the bumper.

In the embodiment of the invention herein illustrated the rear springs of the automobile are shown at 10 connected to each of these springs is a rearwardly extending bracket 11 having a head 12 wherethrough passes one end of a bumper member 13 provided with a series of recesses 14. Through the head 12 also extends a set screw 15 the point of which engages in one of the recesses 14 so that varying distances between the springs 10, and consequently between brackets 11, may be compensated. The bumper member 13 is preferably termed the lower bumper member and the central portion of this member 13 is cut away as at 16. In the upper part of this cut away portion is seated the upper bumper member 17. The adjacent edge portion of the members 13 and 17 are V-shaped in cross section and are specially apart as clearly seen in Figs. 1 and 3. In the slot 18 thus formed is mounted a pair of grooved wheels 19, the edges of the members forming traps for these wheels. These wheels are mounted within a rear casing 20 to the rear of which is secured a lamp casing 21 having rearwardly and outwardly flaring wings 22. In the rear face of casing 21 is set a bull's-eye glass 23 and the casing is cut away at its lower and side portions as at 24 to allow the escape of light downward and laterally. Depending from the casing 2 is a number plate carrier 25 whereto may be attached a number plate 26. By means of this construction it will be seen that the lamp may be slid or rolled along the rear bumper from one end of the slot 18 to the other and adjacent to each of said slot ends there is painted or otherwise indicated on the bumper an arrow 27 showing the direction of turn of the machine. Thus referring to Fig. 1, if the lamp be slid to the left the left hand arrow 27 will be illuminated by the light passing through the slot 24 and at the same time the number plate will be illuminated by the light passing downwardly through said slot.

In order to hold the members 13 and 17 adjustably together so that wear of said members by the wheels 19 may be taken up the following means are provided: At each end of the member 17 is a vertical slot 28 and through this slot and the member 13 passes a bolt 29 provided with a cotter 30. It will be obvious that, within limits, the member 17 may be moved up or down relative to the member 13 thus changing the space between the proximal edges of the said members.

Mounted on the front of the machine is a bar 31 whereon is a slider 32 carrying a plate 33 which is held pressed against the bar by a spring 34. The bar 31 is provided with appropriate notches 35 and the slider 32 is centrally depressed as at 36 opposite the plate 33 so that the depressed portion may fit a notch and thus hold the slider releasably in the center or to the right or left at will. Moreover the slider may be provided with a locking pin 36' fitting in an aperture as at 37 for holding the signal immovably when desired. On the forward face of the bumper member 13 adjacent to one end thereof is provided a dove-tailed slot 38 wherein are slidably mounted bolts 39 carrying a frame 40. By this means the frame may be adjusted longitudinally of the bumper. Mounted in the frame 40 is a winding drum 41 of the type employing a spiral spring to effect winding in one direction. The details of such a drum are common and are deemed unnecessary here to be shown. Wound on the drum is a conductor cord 42 receiving current from a connection 43. This conductor cord extends through an eye fastened to a post 44 extending forwardly from the casing 20. The conductor cord passes from this post into a lamp socket 45 as shown in Fig. 4. To a second post 46 is attached one end of a pull cord 47 which runs over pulleys 48 and has its remaining end connected to the slider 32.

In operation the lamp is normally kept at its central position. If the operator wishes to turn the machine in one direction or the other he moves the slide 32 in accordance therewith. This either pulls on the cord 47 or relaxes this cord. As the cord 47, pulls, the lamp moves toward the right. This causes the conductor cord 42 to be unwound from the drum 41 and increases tension of the winding springs. After the turn is made the slider is moved back to the center portion whereupon the winding spring draws on the cord 42 and moves the lamp back to central position. Correspondingly movement to the left may be indicated. It will be noted that at all times the number plate is kept illuminated.

There has thus been provided a simple and efficient device of the kind described and for the purpose specified.

It is obvious that many minor changes may be made in the form and construction of the invention without departing from the material principles of the invention. It is not therefore desired to confine the engine to the exact form herein shown and described but it is wished to include all such as properly come within the scope claimed.

Having thus described the invention, what is claimed as new, is:—

1. In a direction indicator of the kind described, a channel member having a web provided with a slot having inwardly tapered edges to form guide rails, a lamp carrier having rollers running on said guide rails, and means to prevent spreading of the guide rails and release of the carrier.

2. In combination, a member adapted to extend transversely across the rear of an automobile, a signal slidable longitudinally of said members, a spring operated winding drum at one end of the member, a cord wound on said drum and connected to the signal, a second cord connected to the signal and extending therefrom opposite the first cord, and means adapted for connection adjacent the operator's seat of the automobile and controlling the pull on the second cord.

3. In combination, a member adapted to extend transversely across the rear of an automobile, an electric signal slidable longitudinally of said member, a spring operated winding drum at one end of the member, an operating cord wound on said drum and connected to the signal, a second cord connected to the signal and extending therefrom opposite the first cord, and means adapted for connection adjacent the operator's seat of the automobile and controlling the pull on the second cord.

4. In combination, a rear bumper for automobiles having a slot extending longitudinally thereof and provided with signal indicia at each end, a signal, guide wheels mounted in the slot and supporting the signal, and positive means to move the signal in either direction along the slot.

5. In combination, a rear bumper for automobiles having upper and lower members arranged to form a slot, means to hold the members in adjusted position whereby to regulate the width of the slot, guide wheels mounted in said slot, a signal supported by said guide wheels, and means to move the signal along the slot.

6. In combination, a rear bumper for automobiles having upper and lower members arranged to form a slot, means to hold the members in adjusted position whereby to regulate the width of the slot, guide wheels mounted in said slot, a signal lamp supported on said wheels and apertured to permit lateral and downward passage of light, a support depending from said lamp and having means to attach a number plate thereto, and means to move the signal and number plate support together along said bumper.

7. In combination, a rear bumper for automobiles, a signal lamp slidably mounted thereon and apertured to permit downward passage of light, a number plate support carried by and movable with the lamp, and means to move the lamp along the bumper.

8. In combination, a rear bumper for automobiles, a signal lamp slidably mounted thereon and apertured to permit downward passage of light, a number plate support carried by and movable with the lamp, and means to move the lamp along the bumper comprising a spring drum at one end of the bumper, a cord connected to the lamp and wound on said drum, and a second cord connected to the lamp in the opposite direction and terminating adjacent the operator's seat of an automobile.

9. In combination, a rear bumper for automobiles, a signal lamp slidably mounted thereon and apertured to permit downward passage of light, a number plate support carried by and movable with the lamp, and means to move the lamp along the bumper comprising a spring drum at one end of the bumper, a cord connected to the lamp and wound on said drum, and a second cord connected to the lamp in the opposite direction, a slide supporting bar adapted to extend transverely of an automobile adjacent the instrument board, a slider on said bar, and means holding the slider releasably in selected positions on the bar, the remaining end of the second cord being connected to said slider.

In testimony whereof I affix my signature.
LOUIS FRANK.